Inventor:
Louis A. Smitzer
By Hill, Sherman, Meroni, Gross & Simpson
Attys.

Sept. 20, 1966 L. A. SMITZER 3,273,566

FILE CARD RETRIEVAL DEVICE

Filed Oct. 17, 1962 5 Sheets-Sheet 2

Inventor:
Louis A. Smitzer
By Hill, Sherman, Meroni, Gross & Simpson
Attys.

Inventor:
Louis A. Smitzer
By Hill, Sherman, Meroni, Gross & Simpson
Attys.

FILE CARD RETRIEVAL DEVICE

Filed Oct. 17, 1962

Inventor:
Louis A. Smitzer
By Hill, Sherman, Meroni, Gross & Simpson Attys.

Inventor:
Louis A. Smitzer
By Hill, Sherman, Meroni, Gross & Simpson
Attys.

3,273,566
Patented Sept. 20, 1966

3,273,566
FILE CARD RETRIEVAL DEVICE

Louis A. Smitzer, Chicago, Ill., assignor to Bell & Howell Company, Chicago, Ill., a corporation of Illinois Filed Oct. 17, 1962, Ser. No. 231,215
9 Claims. (Cl. 129—16.1)

This invention relates to improvements in filing systems utilizing coded cards, and more particularly concerns a novel device for retrieving selected cards from a haphazardly filed collection of individually coded cards maintained in an orderly pack in an appropriate receptacle.

Many types of information are desirably recorded on cards of any preferred uniform size which are adapted to be filed away in a drawer or similar receptacle. Such cards may have the material entered thereon in some form of writing or by a reproduction method suitable to record the desired information. Cards are also now utilized for filing microfilmed records of various kinds, with one card often containing a series of microfilm frames of related subject matter. All such cards whether for record or reference purposes must be readily selectable and retrievable from an accumulation of the cards in a file. The filing system should be as foolproof as possible to avoid misfiling and thus, in effect, loss of any cards through inability to locate them when desired.

Various mechanical card finding arrangements have heretofore been proposed including pins, bars, levers, and even some that employ bar magnets or electro-magnets for locating and retrieving desired cards according to some predetermined identifying or coding system.

Prior arrangements have been deficient in a number of respects, among which may be mentioned undue complexity, cumbersomeness, delicate apparatus components, limited range of usefulness, and the like, which have limited or discouraged their adoption to any significant extent.

An important object of the present invention is to overcome the enumerated and other shortcomings of the prior art and to provide a relatively simple, rugged, efficient coded card retrieval apparatus.

Another object of the invention is to provide a new and improved card retrieval apparatus wherein a relatively small, compact retrieval unit is operable to retrieve selected cards from a large number of cards in a filing receptacle by movement of the retrieval unit and the receptacle relatively.

A further object of the invention is to provide a new and improved card retrieval apparatus in which a unit carrying a magnetic card withdrawing element operates, in the relative longitudinal movement of the magnetic element and a pack of magnetically responsive cards disposed in a retaining device, to effect in association with selecting means sorting and withdrawal of one or more selected cards from the pack.

Still another object of the invention is to provide a novel card retrieval apparatus employing a rotary magnet and means on a card supporting member for effecting rotary card withdrawing action of the magnet during relative movement of the magnet and the member.

Yet another object of the invention is to provide a card retrieval apparatus in which a novel card selecting and withdrawing unit and a card receptacle are relatively movable during a card retrieval operation either by movement of the unit relative to the receptacle or by movement of the receptacle relative to the unit.

A still further object of the invention is to provide a new and improved magnetic card retrieval device including a novel arrangement of rotary retrieval magnet and selector bars.

It is also an object of the invention to provide a new and improved card retrieval apparatus employing a novel combination card selecting and withdrawal mechanism.

Yet another object of the invention is to provide a new and improved manually operable card retrieval apparatus.

Other objects, features and advantages of the present invention will be readily apparent from the following detailed description of a preferred embodiment thereof, taken in conjunction with the accompanying drawings, in which.

Figures 1, 2:
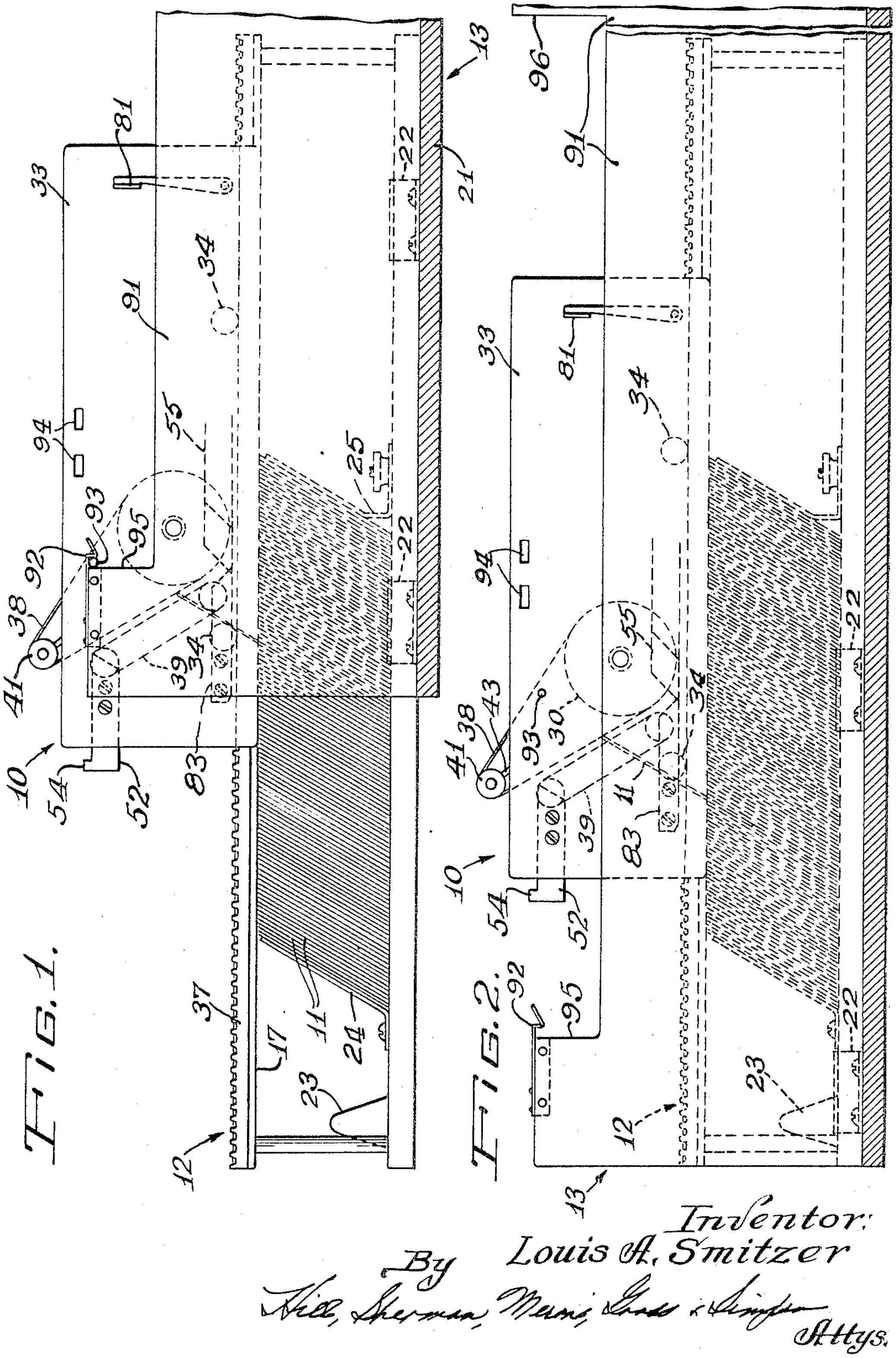
FIGURE 1 is a fragmentary side elevational view of apparatus embodying features of the invention.
FIGURE 2 is a similar side elevational view of the apparatus showing certain of the parts in a different operative relationship.

Referring to FIGURES 1 and 2, a card sorting or retrieval unit 10 is constructed and arranged to withdraw selected cards 11 supported in a horizontal stack or pack in a receptacle structure 12 desirably in the form of a drawer longitudinally reciprocably carried by supporting structure 13 which may be of any suitable character such as a filing cabinet, filing table or other office furniture adapted for the purpose. The construction and relationship of the cooperative component assemblies is such that retrieval of any selected card is accomplished by relative movement between the retrieval unit 10 and the receptacle 12. In the illustrated example the retrieval unit 10 may be held stationary relative to the supporting structure 13 and the receptacle 12 moved longitudinally relative to the retrieval unit 10, as shown in FIGURE 1. Alternatively, the retrieval unit 10 may be moved longitudinally along the receptacle 12 incident to its hunting, sorting, retrieving function, as indicated in FIGURE 2.

Although the file cards 11 have been depicted as substantially wider than in length (FIG. 7), they may be of any preferred dimensions to serve a desired purpose. Further, the cards 11 may be made from any suitable self-sustaining material and may be solid as shown or may be provided with apertures, windows and the like as, for example, where they mount filmed records such as on microfilm to be scanned or viewed in a microfilm viewer. The body of each card may comprise cardboard, synthetic sheet plastic, non-magnetic metal sheet, and the like.

To enable the cards 11 to be magnetically sorted, they are provided along one margin with magnetic tab means 14 conveniently in the form of a doubled over strip of magnetic or magnetically attractive thin sheet metal, and preferably a ferromagnetic material. The magnetic strip 14 provides a tab extending preferably along the entire normally upper edge of the card 11, with the connecting web between the two legs of the strip overlying the card edge, and providing a substantial reinforcement for the upper margin of the card.

In addition, the magnetic tab 14 provides a hanger bar having end portions thereof in the form of projections or lugs 15 extending beyond the opposite side edges of the card body. In a desirable form, the hanger lugs 15 are of equal width and project to equal lengths from the uppermost portions as integral extensions from the tab bar.

In the receptacle drawer assembly 12, the cards 11 are desirably supported in alignment in the pack with their hanger lugs 15 resting upon spaced parallel longitudinally extending supporting rail means in the form of bars 17 carried by vertical posts 18 suitably secured to a base plate 19 having respective longitudinal downturned supporting flanges 20 along its sides arranged to rest slidably upon a supporting panel 21 of the supporting assembly 13. Respective Z-brackets 22 attached to the panel 21 engage with the longitudinal margins of the base panel 19, as shown (FIGS. 1 and 5) to guide the receptacle 12 as a drawer for reciprocable longitudinal movement along the base 21, a handle 23 being provided on the front end portion of the receptacle base plate 19 to facilitate manual protraction or retraction movement of the drawer receptacle relative to the supporting assembly 13.

Figure 4:
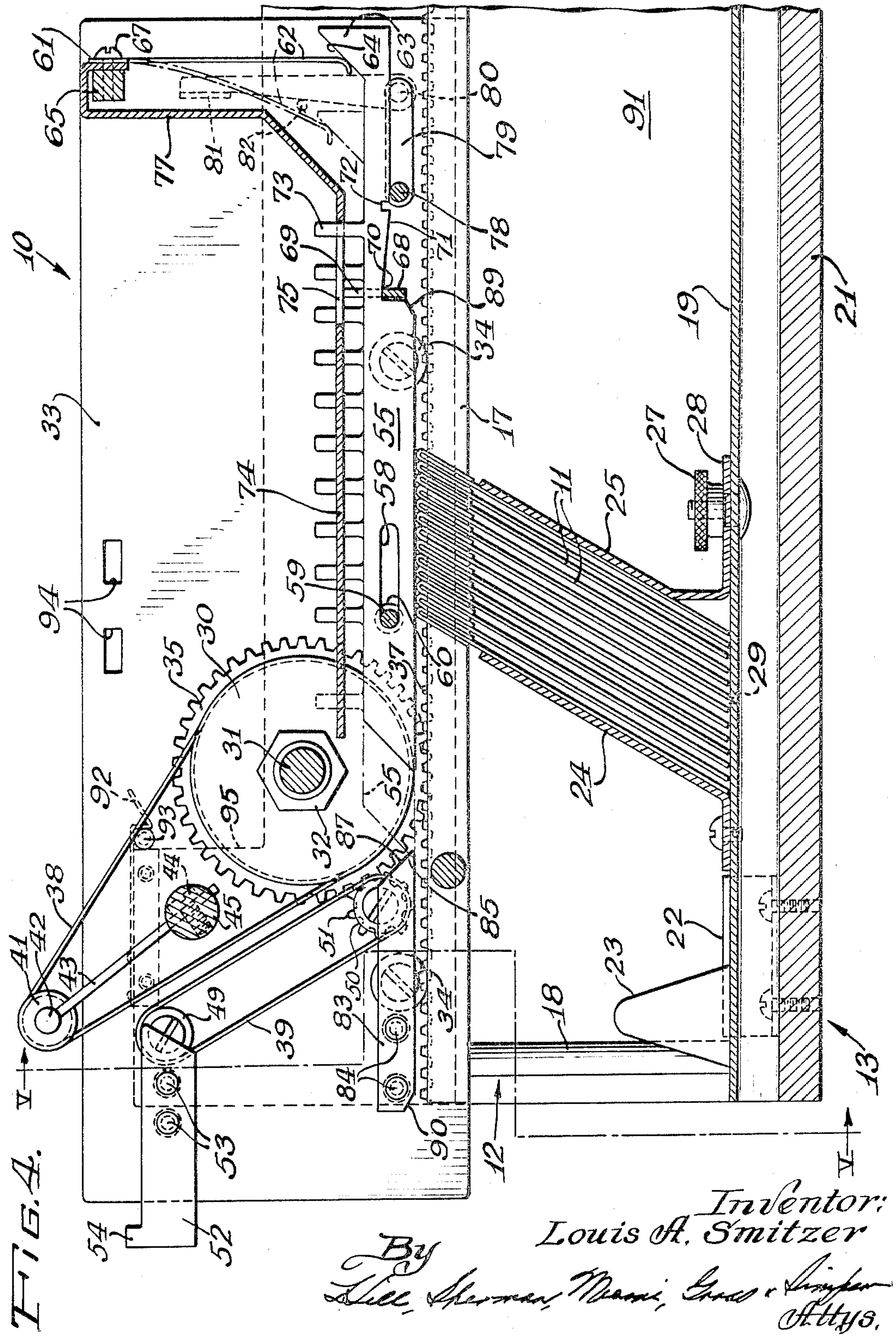
FIGURE 4 is a vertical sectional elevational view taken substantially on the line IV—IV of FIGURE 3.
Figures 6, 7:
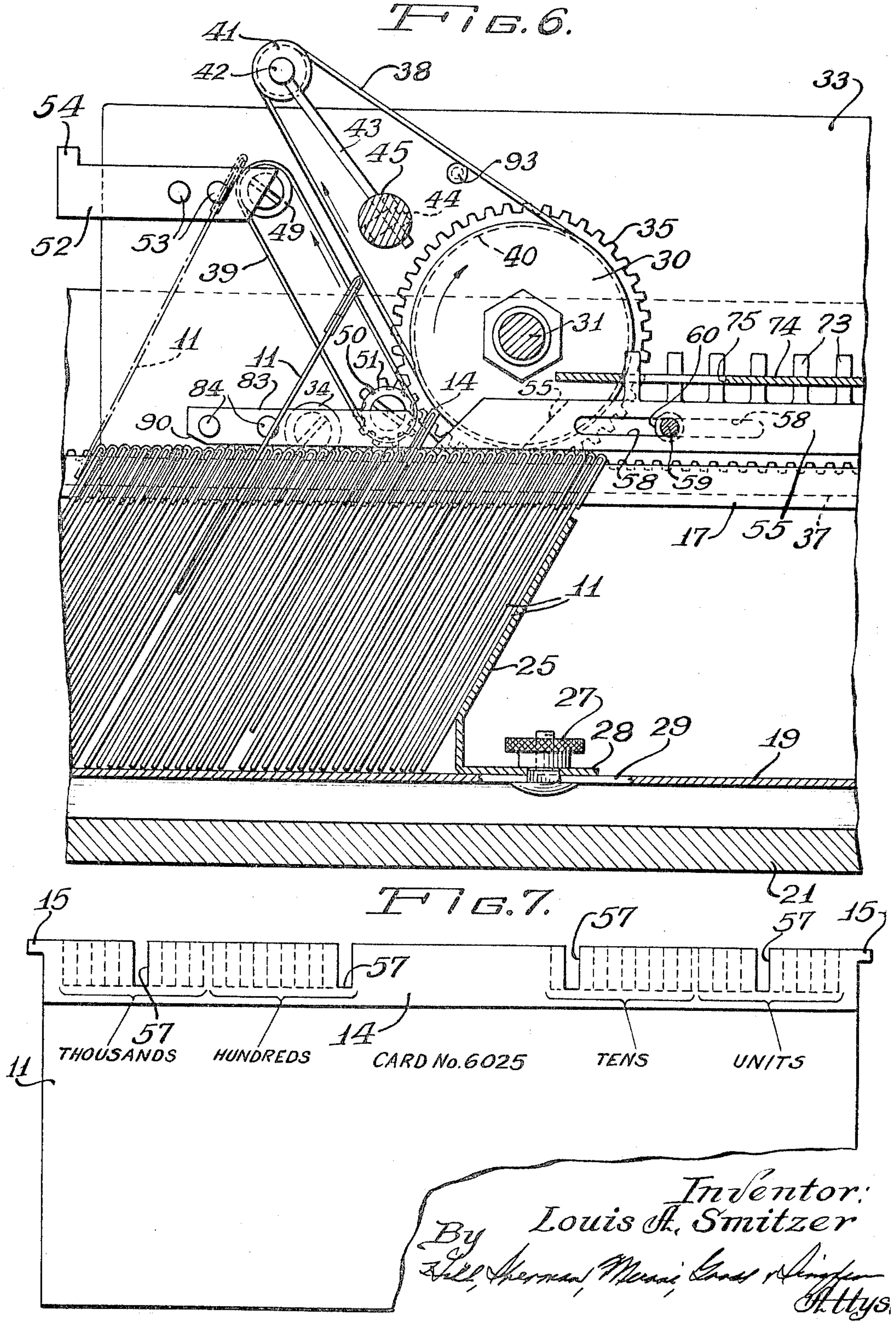
FIGURE 6 is a fragmentary vertical sectional view taken in substantially the same plane as FIGURE 4 but showing the retrieval unit in operation.
FIGURE 7 is a fragmentary face elevational view of a representative file card with which the present apparatus is especially adapted to be used.

In a preferred arrangement, the file cards 11 are supported in a diagonal position slanted in a front-to-rear direction, substantially as shown in FIGURES 1, 2 and 4. About 30° inclination from the vertical is satisfactory, and for this purpose the vertical spacing between the top of the rail bars 17 and the top of the base plate 19 is correlated to the length of the cards 11 so that when the hanger lugs 15 are resting on the tops of the rail bars 17, and the lower edges of the cards are resting on the base plate 19 substantially the preferred inclination will result. In addition, in order to maintain the cards 11 in a reasonably compact pack, opposed pressure plates 24 and 25 are provided. In this instance the pressure plate 24 is mounted fixedly in the front portion of the receptacle assembly 12 and inclines rearwardly, while the pressure plate 25 is in parallel relation thereto and is adjustably mounted at the rear of the pack of cards. Adjustment of the plate 25 may be effected through the medium of a thumb screw 27 arranged to clamp a rearwardly extending foot flange 28 on the pressure plate 25 against the base plate 19 which is provided with a longitudinal adjustment slot 29 accommodating the thumb screw (FIG. 6).

Figure 5:
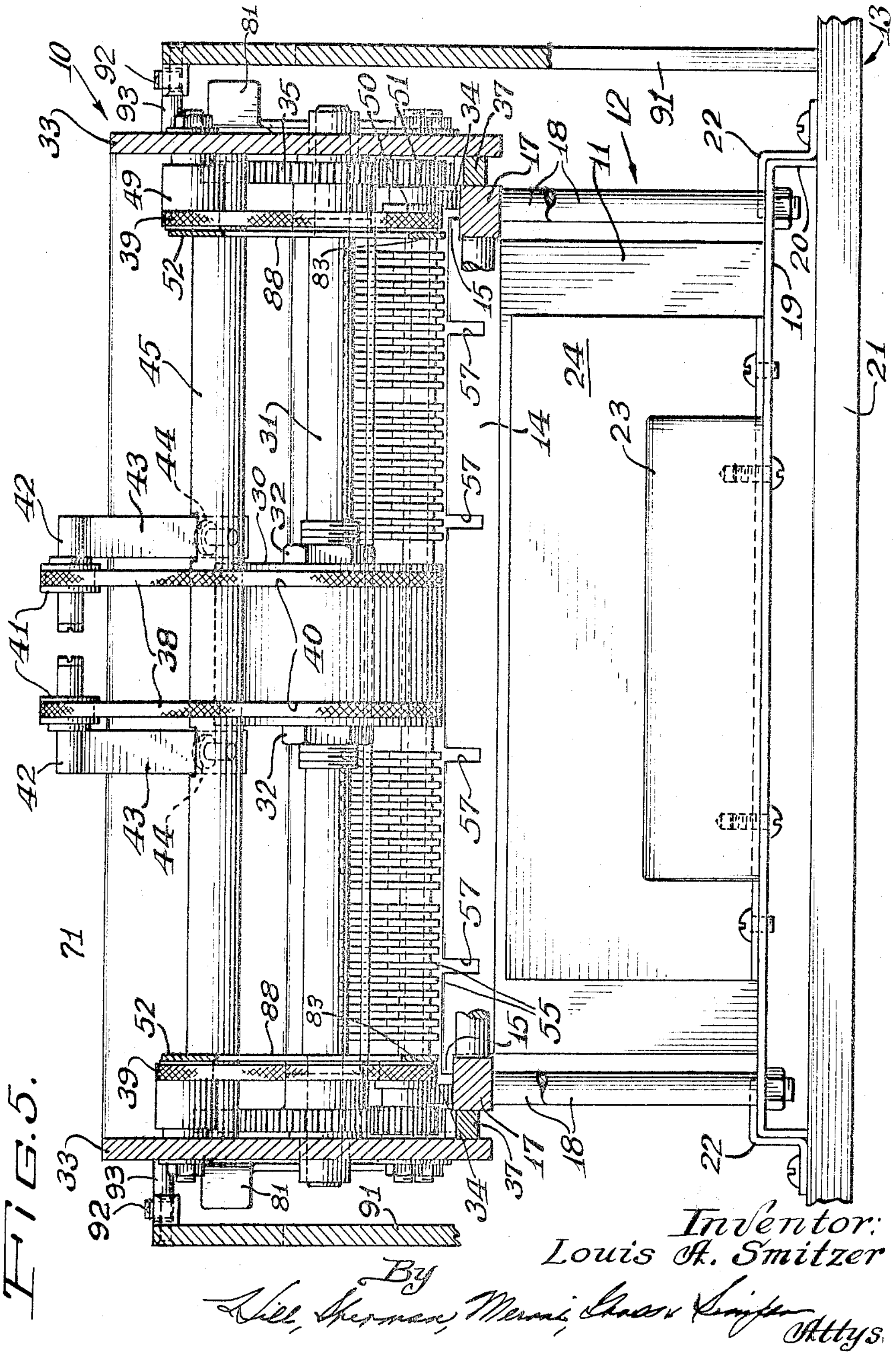
FIGURE 5 is a vertical sectional elevational detail view taken substantially on the line V—V of FIGURE 4.

Magnetic means in the form of a magnetic roll 30 are carried by the retrieval unit 10 for withdrawing selected cards from the pack of cards 11. To this end, the magnetic roll 30 is of a width to overlie a limited central portion of the magnetic edge tab 14 with the perimeter of the roll in a plane close to but just slightly spaced from a plane across the tops of the tabs 14, as best seen in FIG. 5. Support for the roll 30 is provided by a rotatable shaft 31 to which the roll 30 is secured as by means of retaining nuts 32.

Rotary support for the magnetic roll shaft 31 is afforded by longitudinally extending, spaced, parallel, coextensive, substantially identical, vertically disposed frame structures 33, conveniently in the form of suitable plates or panels, of a carriage construction for the retrieval unit 10. These side frame members 33 also carry a set of properly longitudinally spaced antifriction supporting rollers 34 which ride upon the supporting rail bars 17 of the receptacle 12 frame structure. Through the proper elevational orientation of the magnetic sorting or retrieval roll 30 and the carriage supporting rollers 34, in respect to the coplanar track tops of the rail bars 17 and the substantially coplanar top edges of the card tab bars 14 as determined with substantial accuracy by the uniformly dimensioned hanger projection lugs 15, a very efficient cooperative disposition of the sorting nip of the retrieval roll 30 and the opposed magnetic tabs 14 of the cards 11 is afforded in all relative longitudinal positions of the retrieval unit 10 and the card receptacle 12.

Means are provided for effecting operational rotation of the retrieval roll 30 incident to and correlated with relative longitudinal movements of the retrieval unit 10 and the receptacle 12. For this purpose the retrieval roll shaft 31 has rotary drive means connected therewith, conveniently comprising for balanced torque relationship a pair of identical pinion gears 35 mounted corotatively adjacent to its opposite ends immediately inside the carriage frame plates 33 and meshing with respective underlying racks 37 rigid with the rail bars 17 and preferably coextensive therewith. While the racks may, if preferred, be molded or machined in one piece with the rail bars 17, the racks 37 may, as shown, comprise separately formed bars attached in any suitable way to the outer sides of the rail bars 17. On their outer sides, the racks 37 conveniently serve as alignment guides for the carriage of the retrieval unit 10, the lower margins of the carriage side plates 33 depending sufficiently to oppose the rack bar sides closely but in freely slidable relation for this purpose. Through this arrangement, by proper choice of gear ratio between the pinions 35 and the teeth of the racks 37 a desirable correlation of peripheral travel of the retrieval roll 30 and relative linear travel of the retrieval unit 10 and the receptacle 12 is afforded and the rotary speed of the roll is directly proportional to the linear speed. In addition, operationally accurate longitudinal alignment of the retrieval unit and the receptacle are maintained throughout relative longitudinal travel.

By virtue of the direct rack and pinion drive of the magnetic retrieval roll 30, as described, lifting of the selected cards 11 from the pack of cards in the receptacle 12 is effected by adherence due to magnetic attraction of the magnetic tabs 14 of the cards to the off-running side of the retrieval roll 30. Although either the front or rear off-running side of the roll 30 will function for this purpose, in the illustrated example the front off-running side of the roll 30 has been assigned this function, and means are provided to cooperate with the retrieval roll to receive the selected withdrawn cards. For this purpose, a pick off conveyor system has been provided in association with the retrieval roll 30 including friction belt means 38 for diverting the selected cards from the off-running side of the retrieval roll and friction belt means 39 correlated therewith and cooperating to complete the pick off and withdrawal of the selected cards from the card pack.

Figure 3:
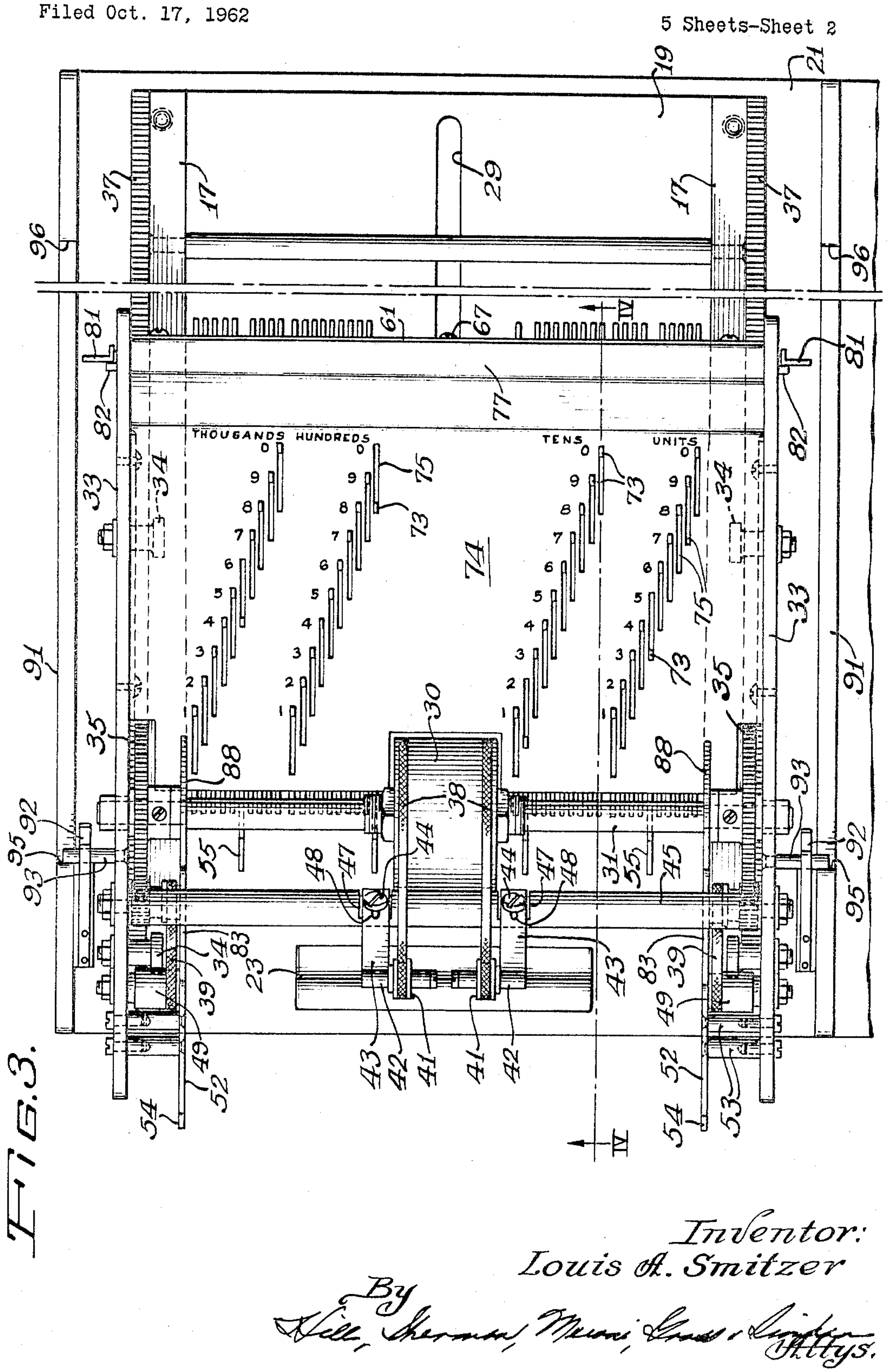
FIGURE 3 is a fragmental enlarged top plan view of the apparatus.

Desirably, the pick off conveyor belt means 38 comprise a pair of narrow friction belts running in complementary narrow respective grooves 40 provided in the perimeter of the magnetic roll 30 adjacent to its opposite ends. By having the grooves 40 of proper depth, the card edge opposing surfaces of the spaced parallel conveyor belts 38 will be within the peripheral plane or outside diameter of the roll 30 where the belts loop over and in running contact with the roll. Such running contact is maintained with the lower, card attracting nip area of the roll 30 by upwardly and forwardly projecting idler and tensioning means comprising a pair of respective idler pulleys 41 mounted on suitable stub shaft axle brackets 42 including respective upwardly and forwardly inclined attachment arm bars 43 secured detachably and adjustably as by means of respective screws 44 to a supporting frame member 45 in the form of a bar extending between and rigidly affixed to the side frame plate 33 as a spacer therefor (FIGS. 3 and 5). Respective guide grooves 47 in the bar 45 accommodate the attached portions of the bracket arms 43 and maintain such arms in substantially parallel alignment and against canting even though only the single screw 44 is utilized in securing each arm to the supporting bar. Longitudinal belt-tensioning adjustment of the axle brackets 42 is afforded by the provision of respective adjustment slots 48 in the arms 43 through which the shanks of the attachment screws 44 extend in the attached portions of the bracket arms 43.

As best visualized in FIGURES 1, 2, 4 and 6, the orientation of the pick off conveyor belts 38 relative to the retrieval roll 30 as maintained by the belt idler and tensioning assembly is upwardly and forwardly in such manner that the off-running run of each belt 38 is disposed at a proper upward and forward angle to remain in card tab engagement throughout the substantially straight-out withdrawal of each card. In a satisfactory arrangement as disclosed, where the cards 11 are tilted at about 30° in the pack, the off-running run of the belts 38 is tilted in a plane about 30° divergently relative to the oblique planes of the cards in the pack.

While the pick off conveyor belts 38 are associated with the retrieval roll 30 to engage central portions of the card tabs 14, the friction belts 39 are mounted, as best seen in FIGURES 3 and 5, in such manner as to engage with the lower edges of the end lugs 15 of the tabs. This is accomplished by having the narrow belts 39 trained over respective upper pulleys 49 and lower pulleys 50 mounted on suitable stub shafts or axles carried by the side frame plates 33. As will be observed in FIGURES 4 and 6, mounting of the pulleys 49 and 50 is such relative to the supporting structure for the conveyor belts 38 that the tab lug engaging runs of the conveyor belts 39 are disposed in a plane which is in proper spaced parallel relation to the tab engaging run of the belts 38 to afford adequate card lifting frictional engagement with the tab lugs 15 while the central portion of a selected card being withdrawn is firmly held in the grip of the off-running runs of the belts 38.

For positive, nonslip card conveying action of the conveyor belts 39, they are driven to run with the conveyor belts 38. This is effected in unison at a common linear speed, or at a slight overrun speed if preferred, by equipping the lower pulleys 50 with respective pinions 51 which mesh with and are driven by the magnetic roll driving pinion gears 35. As a result, as the magnetic tab 14 of a selected card to be withdrawn adheres magnetically to the retrieval nip of the magnetic roll 30 and is then moved upwardly on the off-running side of the rotating roll substantially as shown in FIG. 6, the respective end lugs 15 are carried into engagement with the lower end of the lug-engaging run of the conveyor belts 39, whereupon the off-running run of the conveyor belts 38 thrust the magnetic tabs away from the magnetic roll 30, thus stripping the tabs from the roll and causing the engaged tab 14 to be conveyed upwardly and in a tangential path away from the retrieval roll, thus progressively pulling the selected card 11 from the pack of cards in a smooth, continuous motion initiated by the retrieval roll through its magnetic attraction for the magnetic tab of the card.

Means are provided for receiving the selected cards 11 sorted from the pack of cards in the receptacle 12 and withdrawn by the magnetic retrieval roll 30 and the pick off and withdrawal conveyor system. For this purpose, the active conveying runs of the belts 39 are of a length to maintain card withdrawal grip on the card lugs 15 until the selected cards have been at least substantially fully withdrawn from the pack of cards. Then the supporting end lugs 15 are transferred to respective forwardly extending carrier or hanger bars 52 mounted on attachment studs 53 carried by the inner sides of the front end portions of the frame plates 33. At their inner ends the carrier bars 52 are disposed in receiving relation closely alongside the inner ends of the upper respective idler rollers 49. Through this arrangement, as each of the selected cards reaches the upper end of the withdrawal runs of the conveyor belts 39, the end lugs 15 of the card are carried by the return loops of the belts over the pulleys 49 onto the upper edges of the carrier bars 52. Any possibility of return slippage of the cards is avoided by having the opposing runs of the conveyor belts 38 extend beyond the active runs of the belts 39 and in generally overlying relation, thus assuring positive kick-out of any possibly resistant or laggard card tab.

Means are provided on the carrier bars 52 to complete withdrawal of the lowermost margins of the cards. In this instance, upstanding respective stop lugs 54 on the forward end portions of the bars 52 serve this purpose by engagement with the end lugs 15 of the first card withdrawn, succeeding cards backing up against the first card to the same effect until the supporting rack provided by the carrier bars 52 is loaded or the retrieved cards are removed.

Selection of the cards 11 according to a code system is provided for by means forming part of the retrieval unit 10. To this end, a set of barrier code bars 55 is provided desirably comprising elongated self-sustaining thin flat strips, preferably of metal, although they may be made from other suitable material such as synthetic plastic or the like. These barrier bars are disposed in front-to-rear spaced parallel coextensive relation in vertical planes and with their lower edges in substantially horizontal plane with the lower card tab attracting nip of the retrieval roll 30. Thereby, such lower edges of the barrier bars are spaced above the upper edges of the card tabs 14 in substantially the same closely spaced relation as the lower nip of the retrieval roll. The construction and relationship of the barrier bars 55 is such that they can be adjusted or set to select only those file cards 11 which respond to a specific code arrangement afforded by designated upwardly opening code notches 57 formed as by cutting or notching out the magnetic tab strip 14, as best seen in FIGURES 5 and 7.

In the illustrated apparatus, a digital code arrangement is provided wherein the magnetic tab strip 14 each way from the central portion reserved for coaction with the retrieval roll 30 is adapted to be notched out in any suitable notching or punching device to provide the notch or notches 57 corresponding to a desired code designation. Although as few or many coding areas as desired or practicable may be provided, FIGURE 7 shows four such coding areas representing from left to right thousands, hundreds, tens, and primary digits or units. In each coding area there may be ten digital sections adapted to be selectively punched out to provide one of the coding notches 57 slightly wider for clearance tolerance purposes than the thickness of one of the barrior bars 55. Any permutation of code numbers within the substantial limits permitted by the slot sections in the coding areas are thus provided for. Assuming that the card 11 illustrated in FIGURES 5 and 7 is coded for number 6025, the thousands section corresponding to the 6 position is punched out to provide the coding notch 57 therein, the 0 position in the hundreds area is punched out to provide the coding notch 57 therein, the 2 position is notched out in the tens area and the 5 position is notched out in the units area.

There are as many of the code barrier bars 55 as there are coding punchout sections provided for on the available portions of the length of the tab strip 14 and the barrier bars are aligned in the retrieval unit 10 with the respective punchout sections. Then, by orienting those of the barrier bars 55 which correspond to the coded slotting of the particular card or cards to be sorted from the pack of cards in the receptacle 12, only the card or cards having the proper code slots matching the code set barrier bars can be withdrawn from the pack of cards by the magnetic retrieval roll 30, while all of the remaining cards will be rejected.

In a desirable mounting of the barrier bars 55, each of the bars has a longitudinal slot 58 through which slidably extends a supporting bar or rod 59 secured at its oposite ends to the side frame plates 33. Spacer washers 60 maintain a desirable spaced relationship between the adjacent barrier bars. Normally, the barrier bars 55 are maintained with the forward edges defining the slots 58 serving as stops against the supporting rod 59 and with the front ends or tips of the barrier bars aligned with substantially the vertical diameter of the retrieval roll 30, that is, rearwardly adjacent to the lower retrieval nip of the roll.

Biasing means are provided for yieldably maintaining the respective barrier bars 55 in the retracted, normal rearward position as shown in full line in FIGURE 4. Conveniently this is accomplished by means of a comb spring member 61 having depending biasing spring fingers 62 individually engaging with respective upwardly projecting tail fin abutment portions 63 on the barrier bars each provided with a spring abutment cam edge. Support for the comb spring member is afforded by a transverse frame bar member 65 extending between and secured fixedly to the upper rear portions of the frame plates 33. For removability, the comb spring 61 is attached to the bar 65 as by means of screws 67.

Additional support for the code barrier bars 55 rearwardly from the supporting rod 59 is afforded by a supporting comb bar 68 forming part of the retrieval unit frame structure and mounted between and secured to the side frame plates 33. Each of the barrier bars 55 is accommodated in a separate upwardly opening slot 69 in the supporting bar 68.

In addition to its supporting function, the comb bar 68 serves as a detent member coactive with the respective barrier bars 55 in retaining them in their code set position. For this purpose, the lower margin of the rear end portion of each of the barrier bars 55 is formed with a clearance recess 70 within which the supporting portion of the bar 68 is normally accommodated. This recess has its deepest portion at its forward end and its longitudinal edge provides a downwardly and rearwardly oblique cam surface 71 leading to a detent notch 72 opening downwardly in the edge of the barrier bar at a suitably spaced distance rearwardly correlated with the length of the reciprocation and stop clearance slot 58 to enable protraction of the barrier bar to project the forward end portion into card selecting position aligned with the card retrieving off-running side of the retrieval roll 30. Since the biasing spring finger 62 associated with the barrier bar 55 thrusts downwardly as well as rearwardly on the cam edge 64, it will be appreciated that there will be a snapping interengagement of the comb bar 68 in the detent notch 72 when they are brought into registration by protractional movement of the barrier bar in opposition to the spring bias.

In order to facilitate selective setting of the selector barrier bars 55, digital manipulating means are provided, herein comprising the provision of respective manipulating upwardly extending handle projections 73 on the barrier bars. These handle projections 73 are disposed in relatively staggered relation in the respective groups of barrier bars corresponding to thousands, hundreds, tens and units, as best visualized in FIGURES 3 and 4. For convenience in visually ascertaining the identity of the various key-like handle projections 73, a horizontal keyboard panel 74 is desirably provided overlying the selector barrier bars 55 and having respective longitudinal clearance slots 75 therein for the keys or handles. Appropriate indicia identifying the groups of handles 73 and the identity of each individual handle is desirably provided on the keyboard panel 74 substantially as shown.

Support for the keyboard panel 74 is provided by the carriage frame including the side wall panels 33 and the frame bar 65, with an upwardly projecting rear portion 77 of the keyboard panel engaging upon the bar 65 and secured thereto as by means of the screws 67 and serving to afford a handle by which the carriage of the unit 10 is adapted to be manipulated.

Means are provided for clearing all of the selector barrier bars 55 from their protracted selecting positions to their normal retracted positions. For this purpose, a releasing bail structure is provided including a releasing bar 78 (FIG. 4) underlying the rear end portions of the bars 55 rearwardly from the detent notches 72 of the selector barrier bars so that upward movement of the bail bar 78 rocks the rear end portions of the barrier bars upwardly sufficiently about the axis of the supporting rod 59 to clear the set barrier bars from the interlock bar 68 to be snapped into the retracted position by the respective spring fingers 62. Rockable support for the bail bar 78 is provided by a pair of respective rocker arms 79 projecting rearwardly therefrom and supported at the inner sides of the respective side frame panel 33 on respective rocker pin shafts 80 to the outer end portions of which are attached respective upwardly projecting manipulable release lever arms 81 normally resting in inactive position against stop pins 82 suitably mounted on the panels 33 forwardly of the arms. Thus, in order to release the set selector barrier bars 55, either or both of the bail handle arms 81 are moved rearwardly until the bars are released from the holding detent and snap rearwardly into their normal position.

In addition to the selector barrier bars 55, a pair of fixed stripper and skew preventing bars 83 are provided (FIGS. 3–6) which coact with the code set selector barrier bars 55 to reject all but the cards 11 having code notches 57 corresponding to the designated code setting of the barrier bars 55. To this end, the stripper bars 83 are mounted to overlie the end lugs 15 of the cards in substantially a common plane with the lower nip of the retrieval roll 30 and the lower edges of the barrier bars 55. Each of the stripper bars 83 is desirably a thin elongated strip-like member secured in place fixedly to the inside of the adjacent frame plate 33 by means of studs 84, similar to the studs 53 which secure the carrier bars 52 thereabove, and preferably in the same vertical plane. Each of the stripper bars 83 has on its rear end a lower rearwardly projecting tip 85 extending a short distance rearwardly beyond the tips of the code set barrier bars 55, as depicted in dash outline in FIGURE 4 and full outline in FIGURE 6. Thereby, any card not having the coded notches 57 for which the selector barrier bars 55 have been set will be rejected and caused to remain in the pack of cards because it cannot escape the, in effect, continuous barrier afforded by the cooperating selector barrier bars 55 and the stripper bars 83 extending a sufficient distance both fore and aft of the magnetic field of the retrieval roll 30 to preclude withdrawal of the rejected card or cards. On the other hand, any card that has the prescribed notches for which the selector barrier bars 55 have been set will escape the barrier by virtue of the code notches in the magnetic tab 14 matching the projected barrier bars 55 and thus clearing the projected barrier bars and enabling the selected card to adhere magnetically to the off-running side of the retrieval roll 30 until transferred to the pick off and withdrawal conveyor system. It will be observed that in order to facilitate clearance of the end lugs 15 of the selected card past the adjacent ends of the stripper bars 83, such ends are formed on a clearance chamfer 87, sufficiently spaced from the perimeter of the retrieval roll 30 for the purpose.

Since the magnetic retrieval roll 30 operates on only a short central portion of the magnetic tabs 14 of the cards there may be a tendency as the roll and the card tabs come within the field of magnetic attraction under certain settings of the selector barrier bars 55 to cant upwardly at one end. To avoid such canting, hold down disks 88 of substantially the same diameter as the retrieval roll 30 are mounted on the respective opposite end portions of the roll shaft 31 to overlie the tab strips 14 beyond the respective punch out areas thereof. Desirably the hold down disks 88 are disposed in substantially the same plane as the stripper bars 83.

While the file user or clerk in charge will normally observe that the cards 11 are substantially fully inserted within the pack in the receptacle 12, some of the top magnetic strip clad edges of the cards may from time-to-time project undesirably above the operating plane of the cooperative barrier bars 55 and stripper bars 83. There-fore leadin or pushdown means are provided at the end portions of the bars remote from the retrieval roll 30. In a simple and efficient arrangement, the selector barrier bars 55 are provided with suitable respective cam edges 89 for this purpose. Similarly, the stripper bars 83 are provided with cam edges 90 for this purpose. The cam edges 89 engage and push down any upwardly misaligned card edge when the retrieval unit 10 and the receptacle 12 are in such relative motion that the barrier bars 55 advance over the card edges. Similarly, the cam edges 90 push down any such upwardly misaligned card edges when the relative movement causes the stripper bars 83 to advance over the pack of cards.

In the typical, illustrative setting of the selector barrier bars 55 to effect retrieval of the cards having coding notches 57 corresponding to the number 6025 the operator has, by means of the key handles 73 protracted the corresponding selector barrier bars 55 as shown in full outline in FIGURES 3 and 6 and in dash outline in FIGURE 4. All that need then be done is effect relative movement of the retrieval unit 10 and the receptacle 12 in a manner to advance the retrieval unit over the magnetic top edges on the cards 11 in the direction in which the cards are tilted. Each card that has the selected code punching is successively withdrawn from the card pack by the retrieval roll 30 and the associated conveyor system and delivered to the rack provided by the carrier bars 52. After the retrieval pass of the retrieval unit 10 has been completed, the retrieved cards sorted from the receptacle 12 are removed from the receiving rack and the retrieval unit and the receptacle 12 returned to starting position. During such return all of the cards 11 in the receptacle 12 are retained in their pack positions by the stripper bars 83 and the barrier bars 55 as the retrieval roll 30 runs thereover. The release bail is operated through either or both of the handles 81 to clear the selector panel, and any other card retrieval setting can then be effected. The cards that have been previously removed can be returned haphazardly to the pack of cards in the receptacle 12.

For retaining the retrieval unit 10 stationary with respect to the supporting structure 13 where it is desired to effect card sorting by actuation of the receptacle 12, as depicted in FIGURE 1, releasable latch means on the retrieval unit and the supporting structure 13 are provided. Suitably, upright means such as protective side wall panels 91 rising from the base panel 21 in flanking adjacent relation to the opposite sides of the retrieval unit 10 carry respective resilient detent latch members 92 adjacent the forward end of the assembly engageable with outwardly projecting respective detent studs 93 on the adjacent side frame panels 33 of the retrieval unit. Through this arrangement, the retrieval unit 10 is held in stationary relation to the supporting structure 13 whenever desired. However, when it is preferred to run the retrieval unit 10 along the receptacle 12, as depicted in FIGURE 2, the resilient latches 92 are readily manually released from the detent stud pins 93.

Another advantage of the disclosed retrieval apparatus resides in that since the retrieval unit 10 is of a compact and relatively lightweight construction and is not permanently attached to either the receptacle assembly 12 or the supporting structure 13, the retrieval unit can readily be removed and utilized in sorting cards from any number of receptacles 12 selectively. To facilitate removal and relocation of the retrieval unit 10 a suitable carrying handle (not shown) may be provided engageable with appropriate means such as provided by clearance apertures 94 receptive of projections, fingers or other connecting device on the handle structure.

Overrunning of the retrieval unit 10 relative to the supporting structure 13 in either direction is avoided by a stop shoulder 95 adjacent the front of the members 91 and a stop shoulder 96 adjacent the rear of the members

91 engageable by the pins 93, thus serving, in addition, as stop pins.

During a retrieval operation of the device, withdrawal of the selected card 11 is continuously substantially straight-out, which minimizes frictional resistance, enables the withdrawal to be effected with minimum effort, and by avoidance of bending stresses and minimizing of drag and scuffing assures long card life. Although the card tab 14 during the initial phase of the pull-out clings to the rotary magnetic wheel or roll 30 serving as card extraction-initiating structure, due to the geometry of the magnetic wheel diameter, the diameter of the gears 35 and the relevant angles, the card tab moves with the magnetic wheel in a cycloidal path which effects substantially straight-out movement of the card until the conveyor belts 38 and 39 engage the card tab 14 and continue the straight-out withdrawal of the card as a result of correlation of movement of the belts with respect to the horizontal movement of the retrieval unit.

It will be understood that modifications and variations may be effected without departing from the scope of the novel concepts of the present invention.

I claim as my invention:

1. In a card sorting apparatus for retrieving cards from a pack of cards wherein one of their edges is exposed and has a magnetic portion and code notches, a receptacle for the pack of cards, a retrieval assembly including:

magnetic retrieval roll means and a rotary mount therefor, reciprocably mounted and individually reciprocably adjustable card selecting barrier bars having end portions thereof located in operative alignment with said roll and said bars being mounted to set said end portions selectively in respect to an off-running side of said roll, means for selectively setting said barrier bars for retrieving any card having a predetermined code notch identification, stripper means mounted with respect to said off-running side of the roll to coact with the set barrier bars to reject all but any card having code notches corresponding to the set barrier bars;

and means for effecting relative movement of said assembly concurrently with rotation of said roll in a path of movement wherein the roll successively passes across the exposed edges of the cards in attracting relation to said magnetic portions so that cards having the predetermined notching will be withdrawn past said set barrier bars and said stripper means.

2. Card sorting apparatus as defined in claim 1, wherein said magnetic roll is substantially shorter than the width of the cards and is mounted centrally of the cards, said barrier bars are mounted in groups beyond each end of the magnetic roll, and said stripper means comprise respective bars mounted beyond the groups of barrier bars and remote from the ends of the magnetic roll but in overlying relation to the upper edges of the cards.

3. In card sorting apparatus for retrieving cards from a pack of cards having magnetic portions and code notches on common edges exposed in a substantially common plane, supporting means for the pack of cards, a retrieval assembly including:

a frame structure, a magnetic roll, a shaft rotatably supported by the frame structure and rotatably mounting said roll for effecting withdrawal of the cards from the pack by rotation of the roll within attraction range of the magnetic portions on the card edges, a pinion carried by said shaft, and selectively settable coded card selecting means correlated with said code notches and operatively aligned with said roll so as to be set to reject all cards lacking a predetermined code notch identification;
track means on said supporting means,
rollers on said frame structure riding said track means to enable relative movement of said assembly and said supporting means in a path of movement wherein said roll is caused to pass successively in attracting relation to said magnetic portions of the successive cards in the pack and said selecting means enables the roll to withdraw only any card having said predetermined code notch identification and thereby responding to the selected setting of said selecting means,
and a rack also carried by said supporting means and meshing with said pinion to effect rotation thereof and of said shaft and thereby said roll coincident with said relative movement.

4. In card sorting apparatus for retrieving cards from a pack of cards wherein one of the edges of the cards is exposed and the exposed edges have respective magnetic portions and coding means,
means for supporting the cards in generally upright but oblique relation to the horizontal with their exposed edges in a substantially common horizontal plane,
a retrieval assembly including:
a rotatable magnetic roll having an off-running side for initiating withdrawal of cards from the pack by attracting said magnetic portions,
selectively settable coded card selecting means correlated with said coding means and cooperative with said roll to permit only cards having predetermined code responsiveness to be withdrawn by said off-running side,
pick off conveyor means comprising pick off belts associated with said off-running side of the magnetic roll and operative to divert the selected cards from the off-running side and continue withdrawal of such cards upwardly generally divergently to said oblique inclination of the cards in the pack;
and means for effecting relative movement of said assembly and said supporting means to enable said selection and withdrawal of the cards.

5. In card sorting apparatus for retrieving cards from a pack of cards wherein one of their edges is exposed and has magnetic means and code notches:
supporting means for the pack of cards,
a retrieval assembly including:
a frame structure mounted for relative movement with respect to said supporting means for traversing said card edges,
magnetic card withdrawing means movably mounted on said frame structure and operative to attract said magnetic means on the cards and withdraw the cards successively from the pack in the course of said relative movement,
barrier code bars adjustably mounted on said frame structure and adjacent to said card edges with one of their ends adjacent to said magnetic withdrawing means,
said bars being correlated with said code notches and being selectively settable to position the bars with said ends corresponding to the code notches of a selected card to be withdrawn from the pack,
said ends of the set bars being so located with respect to said magnetic withdrawing means that the code notches of the selected card afford escape clearance past the bar ends for withdrawal by the magnetic withdrawing means but the edges of all other cards are opposed and blocked against any substantial movement from the pack as the magnetic withdrawing means moves past the card edges during said relative movement, and
stripper means carried by said frame structure and cooperative with said bar ends to oppose said other card edges and preclude withdrawal of said other cards while their edge magnetic means are in the magnetic field of said magnetic withdrawal means and after said bar ends progress beyond blocking opposition to said other card edges during said relative movement;
means for effecting said relative movement between said supporting means and said retrieval assembly to effect successive passing of said magnetic withdrawing means in magnetic attracting relation past said magnetic card edge means whereby said selected card is magnetically attracted through its magnetic edge means toward said magnetic withdrawing means, and
means for moving said magnetic withdrawing means during said relative movement to effect withdrawal of said selected card.

6. Card sorting apparatus as defined in claim 5, in which said cards have aligned with said edges respective oppositely extending end lugs projecting beyond the opposite sides of the cards,
said supporting means having longitudinal spaced parallel rails on which said lugs are engaged, and said stripper means comprise respective bar structures overlying said rail means in spaced opposing clearance relation to said lugs.

7. In card sorting apparatus for retrieving cards from a pack of cards wherein one of the edges of the cards is exposed and the exposed edges have respective magnetic portions and coding means and the sides of the cards have respective lugs projecting in alignment with said edges,
a selected card retrieval carriage unit constructed and arranged for operative relative longitudinal card-selecting and retrieval movement in traversing relation across said card edges,
a magnetic roll mounted on said carriage and having an off-running side for initiating withdrawal of cards from the pack by attracting said magnetic means,
selectively settable code-identified card selecting means mounted on said carriage in cooperative relation to said roll and operable to permit only cards having predetermined code responsiveness to be withdrawn by said off-running side during said retrieval movement,
pickoff conveyor means comprising a pickoff belt operatively related to said off-running side of the roll and running in the same direction generally tangentially from said off-running side to engage the edge of and divert a preselected card from the off-running side in a path away from the roll,
respective friction belts engageable with said lugs of the selected card and running parallel to said pickoff belt and in the same direction, and means for driving said roll and said belts in coordinated relation.

8. Apparatus as defined in claim 7, in which said carriage has thereon card receiving rack means aligned with said belts at a position remote from said roll and on which said lugs are engaged after discharge from said belts.

9. In card sorting apparatus for retrieving selected cards from a pack of cards wherein one of the edges of the cards is exposed and has a magnetic portion and code notches,
a carriage constructed and arranged for relative longitudinal movement in traversing relation along said card edges,
card withdrawing means mounted on said carriage and including magnetic means operative during said movement to attract said magnetic portions of the cards and withdraw the cards from the pack successively in the course of said movement, individually reciprocably adjustably settable barrier bars mounted on said carriage and movable relatively longitudinally thereon with portions of the bars located in operative alignment with said card withdrawal means to oppose the card edges, spring biasing means normally acting on said barrier bars to move them longitudinally into clearance relation relative to said withdrawal means so that card edges can escape thereby for withdrawal, means for selectively setting said bars according to predetermined code determination in longitudinal opposition to said biasing means into blocking relation to withdrawal of all cards except any card that has matching code notches, stripper means mounted on said carriage and cooperative with the set bars to preclude withdrawal of any other than the card having matching code notches while said magnetic portions are in the magnetic field of the withdrawal means and after said set bars progress beyond the edges of the other cards during said relative movement, and means for actuating said withdrawal means.

References Cited by the Examiner

UNITED STATES PATENTS

| | | | |
|---|---|---|---|
| 2,217,243 | 2/1917 | Tucker et al. | 129—16 |
| 2,161,649 | 6/1939 | Wilson | 129—16.1 X |
| 2,259,463 | 10/1941 | Griffin | 129—16.1 |
| 2,269,767 | 1/1942 | Jayne | 129—16.1 |
| 2,501,492 | 3/1950 | Bergsten et al. | 129—16.1 |
| 2,577,460 | 12/1951 | Gottschalk | 129—16.1 |
| 2,647,519 | 8/1953 | Broxten | 129—16.1 |
| 2,756,931 | 7/1956 | Drillick. | |
| 2,779,652 | 1/1957 | Orr. | |
| 2,999,424 | 9/1961 | McCammon | 40—79 |
| 3,055,131 | 9/1962 | Novak. | |

FOREIGN PATENTS

| | | |
|---|---|---|
| 915,894 | 8/1946 | France. |
| 1,247,271 | 10/1960 | France. |

JEROME SCHNALL, *Primary Examiner.*